P. C. HEWITT.
ELECTRICAL DISTRIBUTION BY ALTERNATING CURRENTS.
APPLICATION FILED MAR. 21, 1911.
1,110,688.
Patented Sept. 15, 1914.
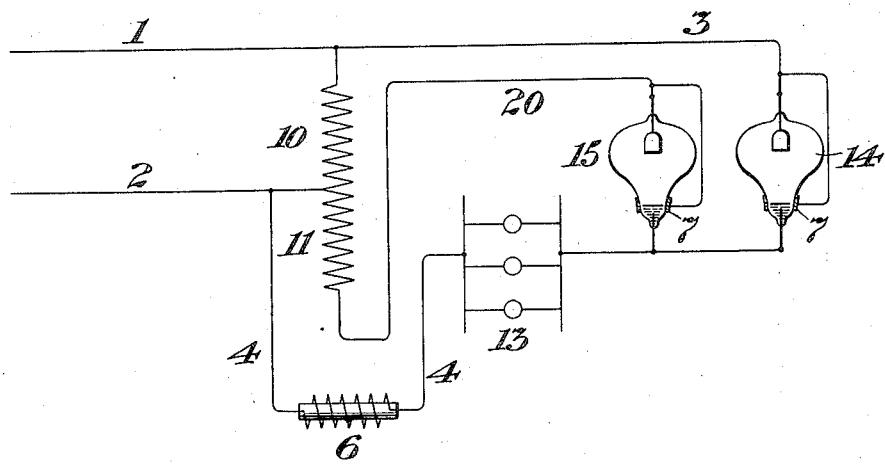
WITNESSES:
INVENTOR
ATTORNEY

UNITED STATES PATENT OFFICE.

PETER COOPER HEWITT, OF RINGWOOD MANOR, NEW JERSEY, ASSIGNOR, BY MESNE ASSIGNMENTS, TO COOPER HEWITT ELECTRIC COMPANY, OF HOBOKEN, NEW JERSEY, A CORPORATION OF NEW JERSEY.

ELECTRICAL DISTRIBUTION BY ALTERNATING CURRENTS.

1,110,688.  Specification of Letters Patent.  Patented Sept. 15, 1914.

Original application filed April 25, 1903, Serial No. 154,304. Divided and this application filed March 21, 1911. Serial No. 615,913.

*To all whom it may concern:*

Be it known that I, PETER COOPER HEWITT, a citizen of the United States, and resident of Ringwood Manor, county of Passaic, State of New Jersey, have invented certain new and useful Improvements in Electrical Distribution by Alternating Currents, of which the following is a specification.

It has been proposed to operate a direct current work circuit from a supply circuit fed by a source of alternating current by interposing at a suitable point or points in the system one or more devices permitting the passage of current in one direction only. Under some conditions, the current thus delivered, though direct, tends to be intermittent to such a degree as to be objectionable. Such objectionable characteristics are noticeable, for example, when the like waves of a current derived from a single phase alternating source are delivered directly to the work circuit through devices of the character mentioned above. If, in addition to the impulses thus directly supplied from the supply circuit to the work circuit, the latter could be impressed with supplemental impulses at times intermediate between direct impulses the flow of current would be steadier. In other words if currents of different phase from that of the supply circuit can be delivered to the work circuit, the desired degree of steadiness would be more nearly attained. The current taken from the secondary of a transformer is nearly opposite in phase to that of the primary circuit, so that if provision be made to pass current directly from the supply circuit to the work circuit in the manner already proposed, and also from the secondary of a transformer fed by the supply circuit, the secondary current, like the primary, passing through a device or devices permitting current flow in only one direction, a much more nearly uniform supply of direct current will be operated than without the use of the secondary current. In practice, the current from the secondary may pass through the same device as that from the primary, or it may pass through a separate device.

I have illustrated my invention in connection with a single phase alternating current supply circuit, although it is applicable to polyphase circuits as well. In either case, the primary and secondary impulses delivered to the work circuit will be approximately symmetrical in the sense that the phase between successive waves or impulses delivered to the work circuit will be approximately the same.

The drawing is a diagram of one type of circuits embodying my invention and applied to the operation of a consumption circuit through Cooper Hewitt rectifiers.

In the drawing 1 and 2 are main conductors leading from any suitable source of single phase alternating currents and 14 and 15 represent vapor electric devices which may be rectifiers of the type now well known. Taking the rectifier 14 as an example, it comprises a suitable container, a positive electrode, 8, and a negative electrode 7. Similarly the device 15 comprises a container with a positive electrode 9 and a negative electrode 7, the negative electrodes of the two devices being joined together outside the containing vessels and extending to one side of a work circuit 13, the other side of which passes by way of a wire, 4, through a reactance or inductance, 6, to the main conductor, 2. Between the mains 1 and 2 is connected a coil, 10, and a coil, 11, is connected between the conductor 2 and a conductor, 20, leading to the positive electrode of the device, 15. Such devices as 14 and 15 offer considerable resistance to the initial passage of current therethrough, but when this is overcome in a given direction, currents in that direction will flow with comparative ease, although they offer a practically prohibitive resistance to the flow of currents in the opposite direction under ordinary conditions of potential. If the conditions are such that the current falls to zero between two succeeding waves, then means should be provided for overcoming the initial resistance at each zero point, but if means are provided for producing retardation of the inductive effect sufficient to prevent the current from falling below the value required to prevent the initial resistance from reestablishing itself, then there will be a continuous flow when once the current is started through the circuit. By using both the positive and the negative waves in a manner such as is herein described the full output of the generator may be availed of.

Any convenient well known means may be employed for overcoming the initial resistance in a given direction, and various other modes of connecting the circuits may be employed. When the inductive load of a work circuit is considerable, the inductive device, C, may be dispensed with.

It will be seen that the two devices, 14 and 15, are affected by two sets of impulses, one derived directly from the supply mains 1 and 2 and the other indirectly through the transformer 10 and 11. As these impulses represent phases which are practically opposite each other, the time at which impulses of one phase are impressed upon the lamp will be substantially intermediate between the times at which the other impulses are impressed upon it. This will tend to a comparative uniformity in the effects produced in the two rectifiers and in the work circuit, 13. The device, 6, when it is used at all, will have the effect of retarding more or less these excessive current impulses and thus, as it were, smooth out the resulting current causing it to be more or less undulatory in character and preventing the occurrence of zero points.

I claim as my invention—

1. In a system of electrical distribution, the combination with a single phase source and a direct current receiving circuit, of two vacuum rectifiers, each comprising an exhausted container, and suitable electrodes therein, one of which is a vaporizable reconstructing cathode, connections from one terminal of the supply to an anode of one rectifier and connections from the other terminal of the supply to an anode in the other rectifier and connections for return currents from the cathodes to the supply through the work circuit, together with means for exciting the said cathodes.

2. In a system of electrical distribution, the combination with a source of alternating current and a direct current work circuit, of a plurality of vapor rectifiers, each comprising an exhausted container with suitable electrodes therein, one being a vaporizable re-constructing cathode, means for connecting each supply terminal with a separate rectifier and means for returning rectified currents from the several cathodes through the work circuit to the source, in combination with exciting means for the several rectifiers.

3. In a system of electrical distribution, the combination with a source of alternating current and a direct current work circuit, of a plurality of vapor rectifiers, each comprising an exhausted container with suitable electrodes therein, one being a vaporizable re-constructing cathode, means for connecting each supply terminal with a separate rectifier and means for returning rectified currents from the several cathodes through the work circuit to the source, in combination with exciting means for the several rectifiers and an inductance in series with the work circuit.

4. In a system of electrical distribution, the combination with a source of alternating current supplied with terminals and an intermediate point and a direct current receiving circuit, of a plurality of vapor rectifiers, each comprising an exhausted container with suitable electrodes therefor, one of which is vaporizable and re-constructing, a connection for each of said rectifiers between a terminal of the supply and a terminal of the receiving circuit, the said work circuit being connected to the vaporizable electrode of each rectifier, and a connection from the other terminal of the receiving circuit to the intermediate point of the supply, in combination with exciting means for said rectifiers whereby said vaporizable electrodes are excited as cathodes.

5. In a system of electrical distribution the combination with a source of alternating current, an auto transformer, and a direct current receiving circuit, of a plurality of vapor rectifiers, each comprising an exhausted container with suitable electrodes therefor, at least one of which is vaporizable and re-constructing, connections for each of said rectifiers between a terminal of the supply and a terminal of the receiving circuit, the said work circuit being connected to the vaporizable electrode of each rectifier and a connection from the other terminal of the receiving circuit to an intermediate point of the auto-transformer in combination with exciting means for said rectifier whereby said vaporizable electrodes are excited as cathodes and an impedance traversed by current in the receiving circuit.

6. In a system of electrical distribution, in which alternating currents are rectified through vacuum rectifiers characterized by exhausted containers and vaporizable re-constructing cathodes, the method of operation, which consists in rectifying each polarity of the supply current separately through its own rectifier, passing current from the several polarities through a single work circuit and exciting each rectifier in such a direction that the several rectified currents flow in the same direction through the work circuit.

7. In an electrical distribution system, a work circuit, direct current translating devices therein, a supply circuit, carrying alternating currents and connected directly to the terminals of the work circuit, in combination with a transformer interposed between the supply and the work circuits, and suitable devices interposed at one or more points in the system whereby the impulses proceeding directly from the supply circuit, and the impulses proceeding from the secondary circuit are permitted to flow through the work circuit in one direction only.

Signed at New York in the county of New York and State of New York this 15th day of March A. D. 1911.

PETER COOPER HEWITT.

Witnesses:
 WM. H. CAPEL,
 THOS. H. BROWN.